UNITED STATES PATENT OFFICE.

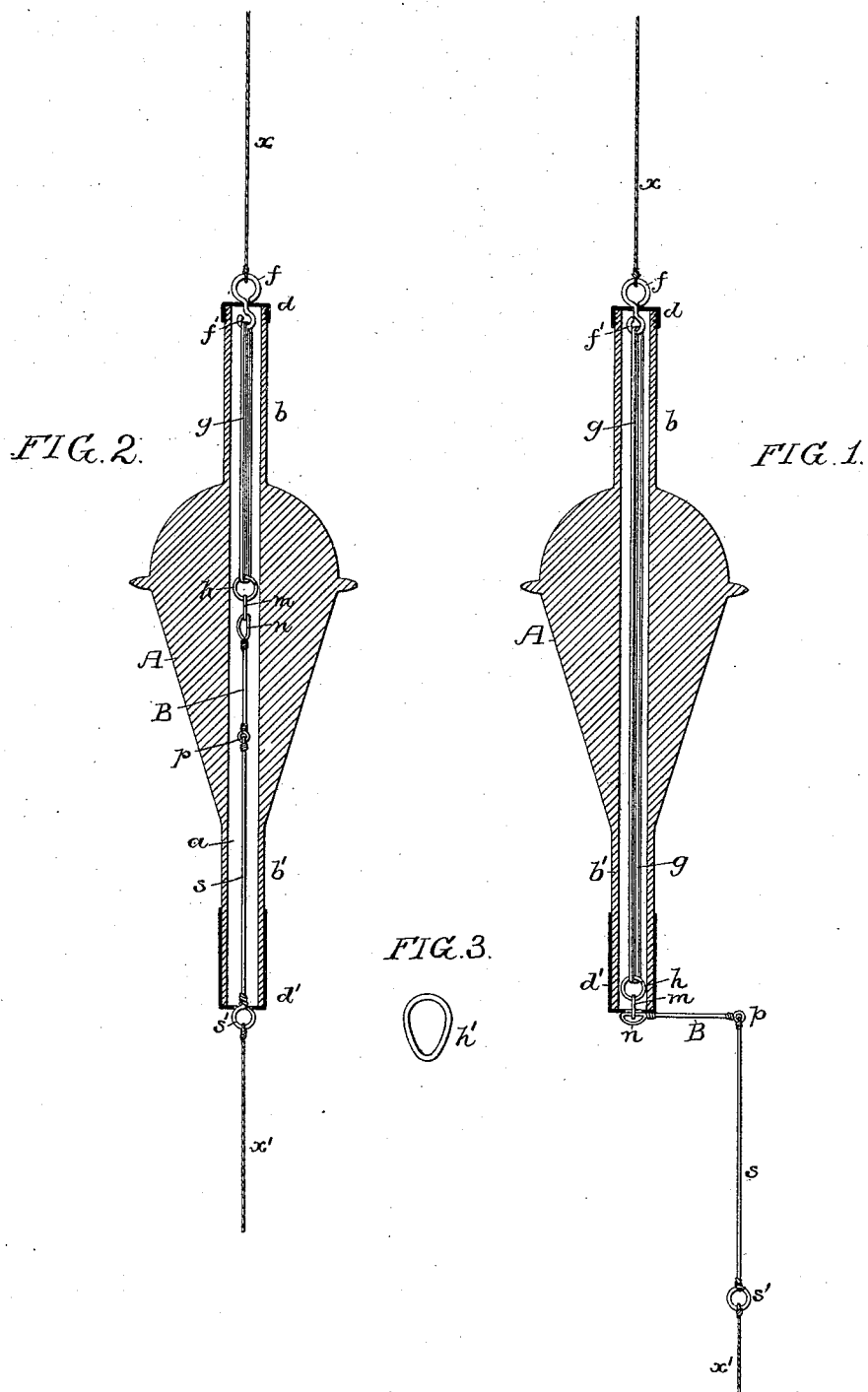

EDWARD E. BARDSLEY, OF PHILADELPHIA, PENNSYLVANIA, ASSIGNOR OF TWO-THIRDS TO WINFIELD S. BARDSLEY, WILLIAM H. FORSTER, AND HENRY BAURMEISTER, OF SAME PLACE.

ATTACHMENT FOR FISHING-LINES.

SPECIFICATION forming part of Letters Patent No. 542,917, dated July 16, 1895.

Application filed May 20, 1895. Serial No. 549,910. (No model.)

*To all whom it may concern:*

Be it known that I, EDWARD E. BARDSLEY, a citizen of the United States, residing in Philadelphia, Pennsylvania, have invented certain Improvements in Spring Attachments for Fishing-Lines, of which the following is a specification.

My invention relates to that class of fishing-line attachments in which a spring-actuated rod or bar is normally held under tension by a trigger intended to be tripped when there is a pull upon the hook, so that the spring imparts a quick jerk to the latter in order to hook the fish. In previous devices of this sort the spring attachment has generally been combined with the sinker or attached to the line in such a position that the snood to which the hook was fastened could be connected directly to the tripping-trigger, the consequence being that the spring was located close to the hook and the pull upon the latter was frequently so sudden and forcible as to cause the hook to miss the fish or tear out of its mouth and thus defeat the purpose for which the attachment was intended. In carrying out my invention, therefore, I combine a spring attachment with the float, so that there is always a considerable length of line between said spring attachment and the hook, this length of line tending to moderate the pull upon said hook and thus overcome the objection above noted.

The invention also consists of a simple form of trigger attachment and permits the use of an ordinary rubber band for the purpose of a spring.

In the accompanying drawings, Figure 1 is a sectional view of a fishing-line float with part of the line and the spring attachment therefor constructed in accordance with my invention, the parts being shown in the position assumed by them when the line is "set." Fig. 2 is a similar view illustrating the position of the parts before setting the same or after the trigger has been tripped and the fish hooked, and Fig. 3 is a view illustrating a slight modification in the construction of one of the parts.

A represents a float of any desired shape or dimensions having through it a central opening $a$, the upper and lower tubular extensions $b$ $b'$ of the float being closed, respectively, by metal caps $d$ $d'$, which may be screwed into place or otherwise retained. The upper cap $d$ carries a shackle comprising an outer eye $f$, to which the upper portion $x$ of the line is attached, and an inner eye $f'$ for receiving the upper end of a rubber band $g$, the lower end of which is engaged by a ring $h$, which is connected by a link $m$ to the elongated eye $n$ of a trigger B, the latter consisting of an arm having at the opposite end from the eye $n$ an eye $p$, to which is connected a short rod $s$, having at the end an eye $s'$, to which is fastened the lower portion $x'$ of the line. In the cap $d'$ at the lower end of the float is an opening of such size that the elongated eye $n$ can pass through the same when the trigger B is adjusted to a position in line with the central tube of the float, the eye bridging the opening, however, and bearing firmly against the under side of the cap $d'$ when the trigger B has been adjusted to a position at right angles to the central tube of the float.

In setting the line, the lower portion $x'$ of the same is pulled out until the trigger B has been entirely withdrawn from the central opening of the float and the elastic band $g$ has been extended and put under tension, undue strain upon the band being prevented by the fact that the ring $h$ at the lower end of the same is too large to pass through the opening in the cap $d'$. The trigger B is then turned to a position at right angles to the central tube of the float, as shown in Fig. 1, so that the eye $n$ of the trigger is drawn firmly against the bottom of the cap $d'$ and the elastic band $g$ is held under tension, the link $m$ occupying a position about the center of the length of the eye $n$, as shown in Fig. 1. As soon, however, as there is the slightest pull upon the line $x'$ the outer end of the trigger B will be drawn downward and the relation of the eye $n$ and link $m$ will be disturbed, the link slipping along to the end of the eye and immediately turning the trigger to a position in line with the central tube of the float, so that the elastic band $g$ is at liberty to contract and pull the trigger and its attachments into said central opening of the float, as shown in Fig. 2, thus imparting to the line $x'$ a pull of such force and suddenness as to insure the hooking of the fish.

A comparatively-strong spring is required in order to give the line the quick jerk which is necessary; but, owing to the length of the line $x'$ between the float and the hook, the force of the pull is so modified by this intervening length of line that the pull upon the hook will not be sufficient to tear it free from the mouth of the fish. The ring $m$ is split, so as to provide for the ready introduction of the lower end of the elastic band $g$ into said ring, and the eye $f'$ is likewise opened sufficiently to permit of the insertion of the upper end of the band. Hence the band can be readily applied or removed and the attachment can thus be kept in operative condition at all times at a small expense. The elastic band $f$ is preferred, although a coiled spring of metal may be used if desired.

The link $m$ may be dispensed with if in place of the ring $h$ a ring $h'$, such as shown in Fig. 3, is used, said ring $h'$ being contracted at the lower end so as to pass through the opening in the cap $d'$ and thus permit the hanging of the trigger directly upon it, the ring thus serving as a link.

Having thus described my invention, I claim and desire to secure by Letters Patent—

1. A spring attachment for fishing lines, consisting of a tubular float, an expansible spring contained therein, and a trigger connected to said spring and to the lower portion of the line, said trigger being adapted to engage with or to be drawn into the hollow float, substantially as specified.

2. A spring attachment for fishing lines, consisting of a casing containing an expansible spring, a trigger having an elongated eye with its shorter axis less and its longer axis greater than the diameter of the opening in the end of the casing, and a pivotal connection between said trigger and the expansible spring, substantially as specified.

3. A spring attachment for fishing lines, consisting of a casing containing an expansible spring, a trigger having an elongated eye whose shorter axis is less and whose longer axis is greater than the diameter of the opening in the end of the casing, and a connection between said trigger and the expansible spring, said connection being of a size partly greater and partly less than that of the opening in the end of the casing, substantially as specified.

4. A spring attachment for fishing lines, consisting of a casing, an elastic band contained within said casing, an open eye with which one end of said band engages, a split ring engaging with the other end of the band, a trigger adapted when in one position to lie across the end of the casing, and when tripped, to be drawn into said casing, and means for hanging the trigger to the split ring at the lower end of the band, substantially as specified.

In testimony whereof I have signed my name to this specification in the presence of two subscribing witnesses.

ED. E. BARDSLEY.

Witnesses:
FRANK E. BECHTOLD,
JOS. H. KLEIN.